2,863,761

RECOVERY OF PLATINUM FROM ALUMINA-PLATINUM-CONTAINING CATALYTIC MATERIALS

Kenneth D. Ashley and Gorgo J. Bruni, Stamford, Conn., assignors to American Cyanamid Company, New York, N. Y., a corporation of Maine No Drawing. Application July 26, 1955
Serial No. 524,618

3 Claims. (Cl. 75—108)

This invention relates to the recovery of platinum from alumina-platinum-containing catalytic materials and, more particularly, pertains to the recovery of platinum from spent catalytic materials which have permanently lost a considerable part of their catalytic activity.

Platinum-containing catalysts are frequently used in the petroleum industry in hydroforming or like processes wherein petroleum heavy naptha or gasoline fractions are treated to improve the anti-knock characteristics thereof. As an example of such processes, a straight run gasoline fraction may be subjected to temperatures of from about 500° F. to about 975° F. and pressures of from about atmospheric to about 1000 pounds per square inch and contacted with the selected platinum-containing catalyst in the presence of hydrogen whereby gasoline having greatly improved anti-knock characteristics is obtained.

After a period of operating service during which time the catalyst gradually loses its effective catalytic activity, it is necessary to reactivate the catalyst to restore its characteristics and this is usually accomplished by passing air or other oxygen-containing gases through the catalyst in order to burn off the interfering carbonaceous materials deposited thereon during the hydroforming process. A particularly suitable manner of effecting such regeneration comprises subjecting the catalyst to temperatures of from about 900° F. to about 1050° F., starting with a gas containing as low as about 2% oxygen and gradually increasing the oxygen concentration so that at the end of the regeneration period, pure air or oxygen is being passed over the catalyst. Following the regeneration the reactivated catalyst is then ready to be re-used in the hydroforming process.

However, after a period of time covering a considerable number of service and regeneration cycles, the activity of the catalyst becomes permanently impaired to an uneconomical extent and further regeneration is ineffectual or impractical. The catalyst is then considered "spent" and is removed from the operation and is replaced with fresh catalyst.

In the case of most other catalytic materials, such as those consisting entirely of silica and alumina, or silica, magnesia and alumina, the spent catalyst would usually be disposed of as cheaply and as economically as possible. However, in the case of those catalysts containing platinum, even in concentrations as low as 0.1% or less by weight, and particularly those having platinum concentrations up to 0.7% or more by weight, the value of such platinum is enormous and represents a large capital investment which must be recovered and re-utilized.

Furthermore, not only must the platinum be recovered from the catalytic materials, but such recoveries must be made as efficiently as possible and as close to 100% as practical, inasmuch as even a 1% loss would represent a large dollar-wise waste.

It is therefore a principal purpose of the present invention to provide an improved process of recovering platinum from alumina-platinum-containing materials.

It is a further principal purpose of the present invention to provide a platinum recovery process capable of recovering close to 100% of the platinum.

Hitherto, the methods commonly employed in the industry, although acceptable thereto, have been aimed at dissolving the platinum from the carrier but have left much to be desired. For example, in one method now in use the spent platinum-containing catalytic material has been completely dissolved in a aqua regia (a mixture of about three to four parts hydrochloric acid and about one part of nitric acid). However, such a method took substantially everything into solution whereby a complicated, time-consuming and expensive separation of the platinum from the other dissolved materials was required. Another method has involved the use of nitric acid alone but such a method has proved wholly unsatisfactory. In still another method, chlorine gas has been used but difficulties have been encountered and low yields have been derived due to the failure of such reactants to completely dissolve the alumina.

We have found that if the alumina-platinum-containing catalyst is treated with a stoichiometric excess of hydrochloric acid, the alumina goes into solution and the metallic platinum, which is in a very finely divided state, remains in suspension. A flocculating agent may then be added to said solution to flocculate the suspended platinum so that it may be separated from the solution and recovered. We have further found that this solution then contains very small concentrations of soluble platinum, perhaps on the order of from about 0.2 to about 25 parts per million which may be precipitated by the passage of hydrogen sulfide through the solution and subsequently separated and recovered, whereby the recovery of the platinum is made even more complete and approaches a value of 100%.

We have further found that, instead of flocculating and separating the suspended platinum from the solution and then precipitating the remaining soluble platinum in the solution with hydrogen sulfide, the soluble platinum can first be precipitated by adding pellets of pure aluminum (about 99% pure) or any other metal, such as zinc or iron which is sufficiently high and above platinum in the electromotive force series and boiling the solution for several hours and then flocculating and separating all the platinum at one time. The aluminum pellets can then be separated from the platinum in the solids by screening or other separating means because of the large difference in particle size between the aluminum pellets and the finely divided platinum. If desired, the aluminum pellets can be reused until completely consumed to avoid the loss of the platinum adhering thereto in small amounts.

The amount of aluminum pellets (or zinc, iron, etc.) used will vary within wide limits and may be as low as about 0.05% by weight of the total catalyst present but, more commercially, will range from about 0.1% to about 0.5%. Higher amounts can be used but will increase the amount of unused pellets to be separated later and is not desired commercially. The time of treatment with the pellets may be as low as about 1 hour but normally ranges from about 1¼ hours to about 3 hours or more, say up to 8 hours.

The stoichiometric excess of hydrochloric acid used in the digestion of the catalyst may be small, say, on the order of about 20% and may be as high as desired, depending on the nature of the catalytic and carrier material used and the economic factors involved. For the purpose of the present invention, however, it has been found that an excess of about 25% to about 60% of a 20–40% hydrochloric acid is preferable. The concentration of the hydrochloric acid need not necessarily be in the range from about 20 to about 40 but may be lower or higher, as desired or required, depending on the factors of the particular situation and it is to be repeated that such a value is merely indicative of a preferred range.

The temperature and duration of the digestion are interdependent factors and may be varied accordingly, depending upon their individual values and upon the degree of excess and the concentration of the hydrochloric acid used. For example, digestion periods of as low as about 20 hours have been found successful as well as digestions of up to about 48 hours or more. Temperatures of from about 80° C. up to about 120° C. or more have been found preferable.

Following the hydrochloric acid digestion, the solution may be diluted so as to form approximately a 9–13% aluminum chloride solution to facilitate handling during the subsequent steps of flocculation and separation of the platinum. Higher or lower concentrations of the solution may be prepared or the dilution omitted entirely, as desired, depending on the particular circumstances involved. For example, an undiluted solution may be filtered, if hot and under pressure, but such has been found to be less desirable economically.

Substantially any flocculating agent capable of aggregating the finely-divided platinum may be added to the aluminum sulfate solution in order to condition and prepare the platinum for separation. Such conditioning or flocculating agents as cellulosic materials, preferably in fibrous form, or "Cyron Size" (a reaction product of a higher fatty acid such as stearic acid, a polyethylene polyamine, such as triethylene tetramine, tetraethylene pentamine or the like and acetic acid), "Flocculating Agent 2026" (a reaction product of cottonseed foots and diethylenetriamine) or high viscosity acrylamide (M. W.=>100,000) may be employed.

The aluminum chloride solution contains on the order of from about 0.2 part per million up to perhaps 25 or more parts per million of soluble platinum, perhaps in the form of incompletely reduced platinum chloride, and it is desirable economically to recover this amount. Recovery may be effected by bubbling in hydrogen sulfide to precipitate the soluble platinum as platinum sulfide and then separating and recovering the same.

If desired, the hydrogen sulfide may be bubbled through the solution containing the metallic platinum, followed by the addition of the flocculating agent, whereby filtration yields a mixture of platinum and platinum sulfide which may be separated at a later time. However, if desired, the metallic platinum may be flocculated first and may be separated and recovered by filtering and then the platinum sulfide may be precipitated by the passage of the hydrogen sulfide through the filtrate whereby separation of the platinum and the platinum sulfide is obviated. Or, if desired, the use of aluminum pellets, as previously described, may be resorted to in order to recover the platinum.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example 1*

A catalyst containing 0.6% platinum on alumina was used for 5 months in hydroforming a straight run naphtha to produce a gasoline of around 90 research octane rating. At the end of that time, the catalyst had lost a considerable part of its activity. The catalyst was removed from the unit and was treated in order to recover the platinum.

Twenty pounds of spent catalyst was digested with 180 pounds of 37% hydrochloric acid for 24 hours at 92–115° C. with rapid agitation in a glass-lined vessel. The acid was added over a period of 8 hours. The alumina was dissolved, leaving the platinum in suspension. The solution was diluted with enough water to produce a 12% AlCl$_3$ solution. Then a flocculant comprising 0.14 pound of Cyron Size was added. The flocculated platinum settled to the bottom of the digestion vessel. The supernatant liquid was drawn off, and the platinum was filtered on a suitable filtering medium, preferably using diatomaceous earth or ground alpha-cellulose as a filter aid.

The recovered platinum was almost pure enough for conversion to chloroplatinic acid for reuse in a new batch of catalyst; practically all of the metallic impurities picked up by the catalyst in use were dissolved in the hydrochloric acid. The diluted solution contained only about 2–4 p. p. m. of soluble platinum. This was recovered by bubbling in some hydrogen sulfide, flocculating the platinum sulfide, and filtering.

*Example 2*

A catalyst containing 0.25% platinum on alumina was used for 5 months in hydroforming a straight-run naphtha to produce a gasoline of around 90 octane rating. At the end of this time, the catalyst had lost a considerable part of its activity. The catalyst was removed from the unit and was treated to recover the platinum.

Twenty pounds of spent catalyst was digested with 163 pounds of 37% hydrochloric acid for 30 hours at 85–117° C. with rapid agitation in a glass-lined vessel. The acid was added over a period of 6 hours. The alumina was dissolved, leaving the platinum in suspension. The solution was diluted with enough water to produce a 11% AlCl$_3$ solution. Then, a flocculant comprising 0.3 pound of Flocculating Agent 2026 was added. The flocculated platinum settled to the bottom of the pot. The supernatant liquid was drawn off, and the platinum was filtered on a suitable filtering medium, using diatomaceous earth as a filter aid.

The recovered platinum was almost pure enough for conversion to chloroplatinic acid for reuse in a new batch of catalyst; practically all of the metallic impurities picked up by the catalyst in use were dissolved in the hydrochloric acid.

The diluted solution contained only about 6 p. p. m. of soluble platinum. This was recovered by bubbling in some hydrogen sulfide, flocculating the platinum sulfide, and filtering.

*Example 3*

A catalyst containing 0.6% platinum on alumina was used for 5 months in hydroforming a straight-run naphtha to produce a gasoline of around 90 research octane rating. At the end of this time, the catalyst had lost a considerable part of its activity. The catalyst was removed from the unit and was treated to recover the platinum.

Twenty pounds of spent catalyst was digested with 190 pounds of 37% hydrochloric acid for 24 hours at 95–115° C. with rapid agitation in a glass-lined vessel. The acid was added over a period of 6 hours. The alumina was dissolved, leaving the platinum in suspension. The solution was diluted with enough water to produce a 10% AlCl$_3$ solution. Then a flocculant comprising 0.25 pound of Cyron Size was added. The flocculated platinum settled to the bottom of the pot. The supernatant liquid was drawn off, and the platinum was filtered on a suitable filtering medium, using diatomaceous earth as a filter aid.

The recovered platinum was almost pure enough for conversion to chloroplatinic acid for reuse in a new batch of catalyst; practically all of the metallic impurities picked up by the catalyst in use were dissolved in the hydrochloric acid.

The diluted solution contained only about 8 p. p. m. of soluble platinum. This was recovered by bubbling in some hydrogen sulfide, flocculating the platinum sulfide, and filtering.

Example 4

A catalyst containing 0.6% platinum on alumina was used for 5 months in hydroforming a straight-run naphtha to produce a gasoline of around 90 research octane rating. At the end of this time, the catalyst had lost a considerable part of its activity. The catalyst was removed from the unit and was treated to recover the platinum.

Twenty pounds of spent catalyst was digested with 350 pounds of 20% hydrochloric acid for 24 hours at 110–120° C. with rapid agitation in a glass-lined vessel. All the acid was added at the beginning. The alumina was dissolved, leaving the platinum in suspension. The solution was diluted with enough water to produce a 10% $AlCl_3$ solution. Then a flocculant comprising 0.25 pounds of Cyron Size was added. The flocculant platinum settled to the bottom of the pot. The supernatant liquid was drawn off, and the platinum was filtered on a suitable filtering medium, using diatomaceous earth as a filter aid.

The recovered platinum was almost pure enough for conversion to chloroplatinic acid for reuse in a new batch of catalyst; practically all of the metallic impurities picked up by the catalyst in use were dissolved in the hydrochloric acid.

The diluted solution contained only about 8 p. p. m. of soluble platinum. This was recovered by bubbling in some hydrogen sulfide, flocculating the platinum sulfide, and filtering.

Example 5

100 gms. of partially spent platforming catalyst containing 0.6% platinum was heated to 1600° F. for 7 hours. The purpose of this heating was to simulate regenerations where the temperature might accidently get out of control and the catalyst would get overheated. After heating, the catalyst was digested in 900 grams of 37% hydrochloric acid and refluxed for 20 hours at 90–120° C. The acid was added over a period of 10 hours. During the last 8 hours of digestion, 0.5 gram of aluminum pellets (99%) was added. The solution was then diluted to approximately a 12% concentration of aluminum chloride. A flocculating agent comprising 45 grams of a 0.2% high viscosity polyacrylamide (M. W.=1,000,000) solution was added. The flocculated platinum settled to the bottom of the pot. The supernatant liquid was drawn off and filtered through paper used for medium precipitates. The platinum was filtered and washed through the same medium. No filter aid was used.

The aluminum pellets were separated from the platinum. The platinum cake was ignited to burn off the paper. The residue contained approximately 96.8% platinum which was considered pure enough for conversion to chloroplatinic acid for reuse in manufacturing a new batch of catalyst. The recovery was in the order of 99.5%. The remainder of the platinum was deposited on the surface of the aluminum pellets.

Although we have described but a few specific examples of our invention, we consider the case not to be limited thereby to the specific substances mentioned therein, but to include various other equivalent compounds of similar constitution as set forth in the claims appended hereto. It is understood that any suitable changes or variations may be made without departing from the spirit or scope of the inventive concept.

What we claim is:

1. A method of recovering platinum from an alumina-platinum catalyst which comprises digesting said catalyst with aqueous hydrochloric acid and thereby forming a suspension of finely divided metallic platinum in an aqueous aluminum chloride solution, adding a flocculating agent to said suspension and thereby flocculating the finely divided platinum particles suspended therein, and separating the flocculated platinum from the solution.

2. A method of recovering platinum from an alumina-platinum catalyst which comprises digesting said catalyst with aqueous hydrochloric acid and thereby forming a suspension of finely divided metallic platinum in an aqueous aluminum chloride solution, passing hydrogen sulfide through said solution to precipitate any dissolved platinum therein, adding a flocculating agent to said suspension and thereby flocculating the finely divided platinum particles suspended therein, and separating the flocculated platinum from the solution.

3. A method of recovering platinum from an alumina-platinum catalyst which comprises digesting said catalyst with a 20 to 60% stoichiometric excess of 20 to 40% aqueous hydrochloric acid and thereby forming a suspension of finely divided metallic platinum in an aqueous aluminum chloride solution, adding to said suspension a flocculating agent selected from the group consisting of fibrous cellulosic materials, the acetate of a stearic acid-polyethylenepolyamine condensation product, a cottonseed foots-diethylene-triamine reaction product, and high viscosity polyacrylamide and thereby flocculating the finely divided platinum particles suspended therein, and separating the flocculated platinum from the solution.

References Cited in the file of this patent

UNITED STATES PATENTS

| | | |
|---|---|---|
| 558,725 | Gooch | Apr. 21, 1896 |
| 2,710,799 | Leopard | June 14, 1955 |
| 2,787,540 | Appell | Apr. 2, 1957 |